(12) United States Patent
Pili

(10) Patent No.: US 8,348,228 B2
(45) Date of Patent: Jan. 8, 2013

(54) ZERO-LEAK VARIABLE RATE HIGH PRESSURE METERING VALVE

(75) Inventor: Roger R. Pili, Madison, WI (US)

(73) Assignee: Actuant Corporation, Menomonee Falls, WI (US)

(*) Notice: Subject to any disclaimer, the term of this patent is extended or adjusted under 35 U.S.C. 154(b) by 742 days.

(21) Appl. No.: 12/444,779

(22) PCT Filed: Oct. 15, 2007

(86) PCT No.: PCT/US2007/081389
§ 371 (c)(1),
(2), (4) Date: Oct. 28, 2009

(87) PCT Pub. No.: WO2008/048927
PCT Pub. Date: Apr. 24, 2008

(65) Prior Publication Data
US 2010/0038577 A1 Feb. 18, 2010

Related U.S. Application Data

(60) Provisional application No. 60/829,777, filed on Oct. 17, 2006.

(51) Int. Cl.
*F16K 47/00* (2006.01)
(52) U.S. Cl. ......... 251/123; 251/122; 251/339; 251/321
(58) Field of Classification Search .......... 251/319–322, 251/282, 205, 123, 121, 122, 339
See application file for complete search history.

(56) References Cited

U.S. PATENT DOCUMENTS

| 1,353,415 | A | * | 9/1920 | Newsom et al. | 137/232 |
|---|---|---|---|---|---|
| 1,392,440 | A | * | 10/1921 | Newsom | 137/234 |
| 1,510,802 | A | * | 10/1924 | Scott | 251/121 |
| 2,058,631 | A | * | 10/1936 | Rice | 251/48 |
| 2,612,342 | A | * | 9/1952 | Terry | 251/50 |
| 2,685,294 | A | * | 8/1954 | Gold et al. | 137/1 |
| 3,521,853 | A | * | 7/1970 | Pennington et al. | 251/122 |
| 3,647,344 | A | * | 3/1972 | Skibo et al. | 425/379.1 |
| 3,734,124 | A | * | 5/1973 | Zanoni et al. | 137/430 |
| 4,350,050 | A | * | 9/1982 | Nelson | 73/861.54 |
| 4,538,791 | A | * | 9/1985 | Wostal | 251/339 |
| 4,811,649 | A | * | 3/1989 | Heusser | 91/47 |
| 6,491,282 | B2 | * | 12/2002 | Fink, Jr. | 251/319 |
| 6,609,697 | B2 | * | 8/2003 | Gsteu | 251/121 |
| 6,877,715 | B2 | * | 4/2005 | Kajitani | 251/63.5 |

OTHER PUBLICATIONS

The International Search Report and Written Opinion as mailed on Jun. 5, 2008 for International Patent Application PCT/US2007/081389.

* cited by examiner

*Primary Examiner* — John K Fristoe, Jr.
*Assistant Examiner* — Marina Tietjen
(74) *Attorney, Agent, or Firm* — Quarles & Brady LLP

(57) ABSTRACT

A high pressure metering valve has a valve element with a closing portion, a metering portion and a rapid return portion. The closing portion seats against a corner seat at the end of a valve bore in which the metering portion has a close sliding fit. When the element is unseated, a flow rate can be metered depending on the overlapping length of the metering portion in the valve bore. At the opposite end of the metering portion, the rapid return portion is undercut to be of smaller area than the metering portion to provide a full open state for rapid fluid return.

14 Claims, 5 Drawing Sheets

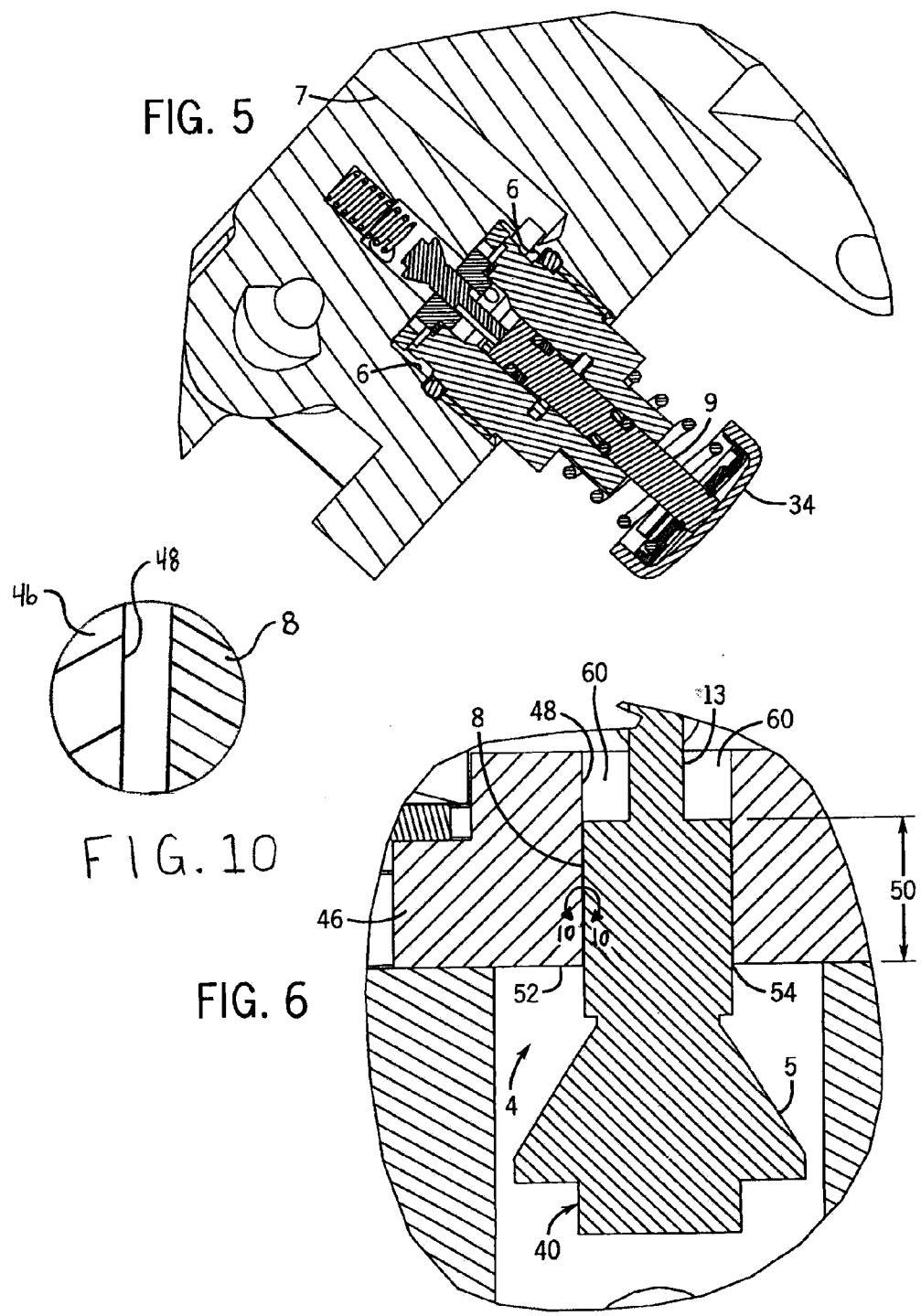

ZERO-LEAK VARIABLE RATE HIGH PRESSURE METERING VALVE

CROSS-REFERENCE TO RELATED APPLICATION

This application claims priority to PCT International Application No. PCT/US2007/081389 filed on Oct. 15, 2007, which claims priority to U.S. Provisional Patent Application No. 60/829,777 filed on Oct. 17, 2006, incorporated by reference herein.

STATEMENT CONCERNING FEDERALLY SPONSORED RESEARCH OR DEVELOPMENT

Not applicable.

FIELD OF THE INVENTION

This invention relates to high pressure hydraulic valves.

BACKGROUND OF THE INVENTION

The field of hydraulics can generally be categorized as high pressure hydraulics, i.e. hydraulics in which the pressures involved are over 5,000 psi, and low pressure hydraulics in which the pressures are less than 5,000 psi. Low pressure hydraulic applications include such things as automotive hydraulics, vehicular leveling jacks and slide-out systems. High pressure hydraulics, on the other hand, are in a different class and generally regarded as an "industrial only" application due to the special expertise that is required when dealing with these applications.

In high pressure hydraulics, the forces generated by the high pressures, which can be in excess of 10,000 psi, can make controlling the forces difficult. Further exacerbating the problem is that in some applications, for example, holding the load with a cylinder, no or only minimal leakage is permissible. Therefore, valves must not only be operable at the high pressure, but also must not leak in these applications.

In addition, some applications require position or speed adjustment, in addition to on and off operation. For these applications, a typical solution is to provide one valve to act as an on/off valve, and another valve, like a needle valve, to perform a metering function. This requires operating two valves in concert with one another to turn on the flow and adjust it.

In addition, some of these same applications can require a more rapid return function, for example if the load is to be returned quickly to a starting or at rest position. Thus, in these applications, a valve with a rapid return function is needed.

SUMMARY OF THE INVENTION

The present invention provides a valve particularly for high pressure applications which is manually operable with a reasonable force to be exerted by a human and that can be used to completely turn off high pressure hydraulic flow with essentially zero leakage, can be used to simultaneously turn on hydraulic flow and meter the rate of hydraulic flow past the valve and can also be actuated to a full open position for rapid return, using a single actuator.

A valve of the invention has a valve housing having a valve bore defining a valve bore axis, the valve bore having a certain length between opposing end faces with one of the end faces defining a valve seat at a juncture between the end face and the valve bore. A valve element is movable along the valve bore axis within the valve bore, the element having a variable flow portion between a closing portion and a full open portion, the variable flow portion fitting in the bore with a certain clearance between the variable flow portion and the bore and movable relative to the bore so that the length of the variable flow portion that overlaps the bore varies as the element is moved from a closed position to a full open position. The closing portion of the valve element seats against the valve seat in the closed position to establish a shear seal with the seat, and the open portion permits the variable flow portion to be moved out of the valve bore to permit flow for the length of the valve bore between the valve bore and the open portion in the open position. The valve element is biased into the closed position by fluid pressure and moves into the open position against the bias of the fluid pressure.

In preferred aspects, the bore is cylindrical, the closed portion of the valve element is frusto-conical, and the three portions are integral with one another. The valve can preferably be manually operated with an actuator, and the actuator is preferably spring-biased to a closed position of the actuator. The valve is also preferably pressure balanced to reduce the forces required for actuation.

The foregoing and other objects and advantages of the invention will appear in the detailed description which follows. In the description, reference is made to the accompanying drawings which illustrate a preferred embodiment of the invention.

BRIEF DESCRIPTION OF THE DRAWINGS

FIG. 5 is a fragmentary cross-sectional view from the plane of the line 5-5 of FIG. 2;

FIG. 6 is a detail view of the valve in a metering position;

FIG. 10 is an enlarged detail view of the portion circumscribed by arc 10-10 in FIG. 6 showing an example clearance exaggerated for clarity.

DETAILED DESCRIPTION OF THE PREFERRED EMBODIMENTS

Figure 1:
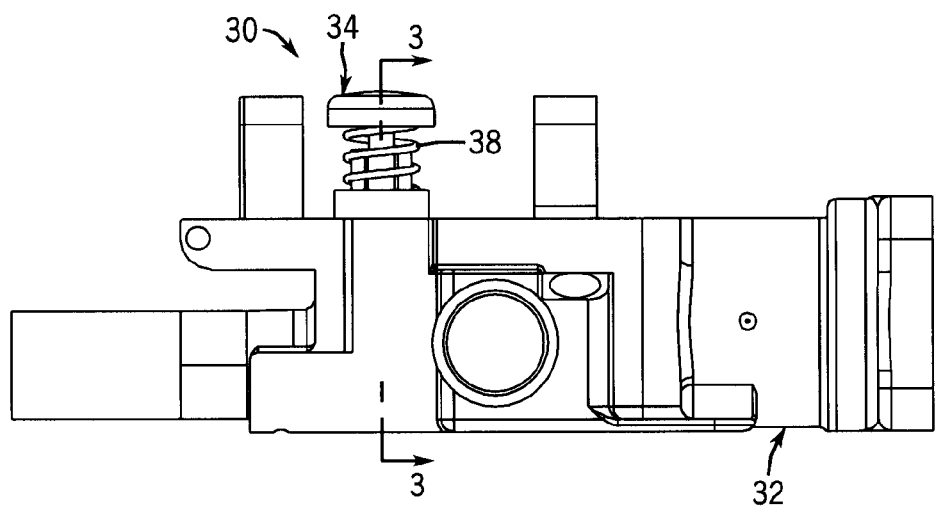
FIG. 1 is a side plan view of a valve incorporating the invention.
Figure 2:
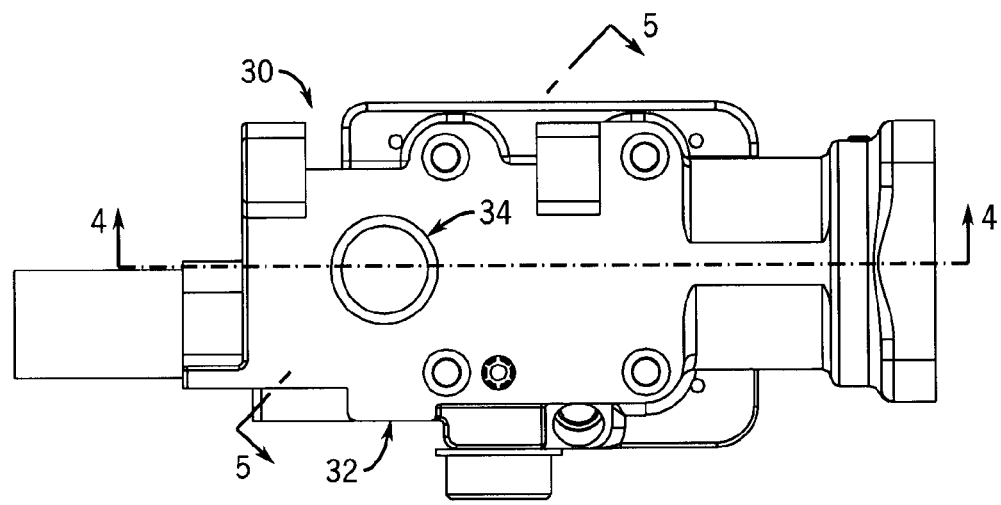
FIG. 2 is a top plan view of the valve of FIG. 1.
Figure 3:
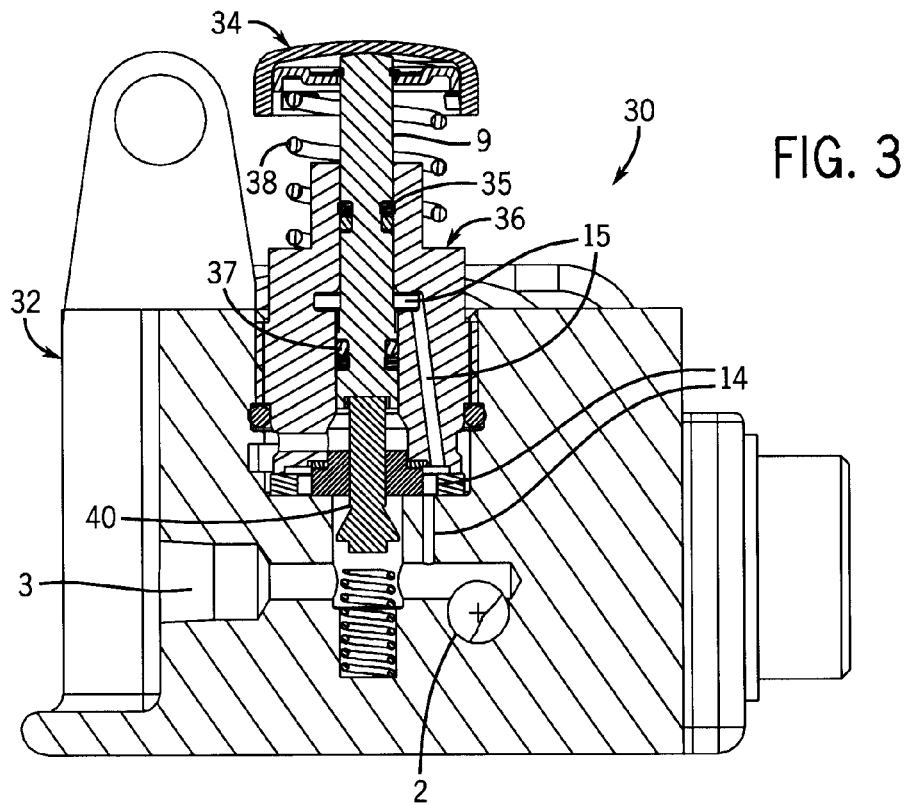
FIG. 3 is a cross-sectional view from the plane of the line 3-3 of FIG. 1.
Figure 4:
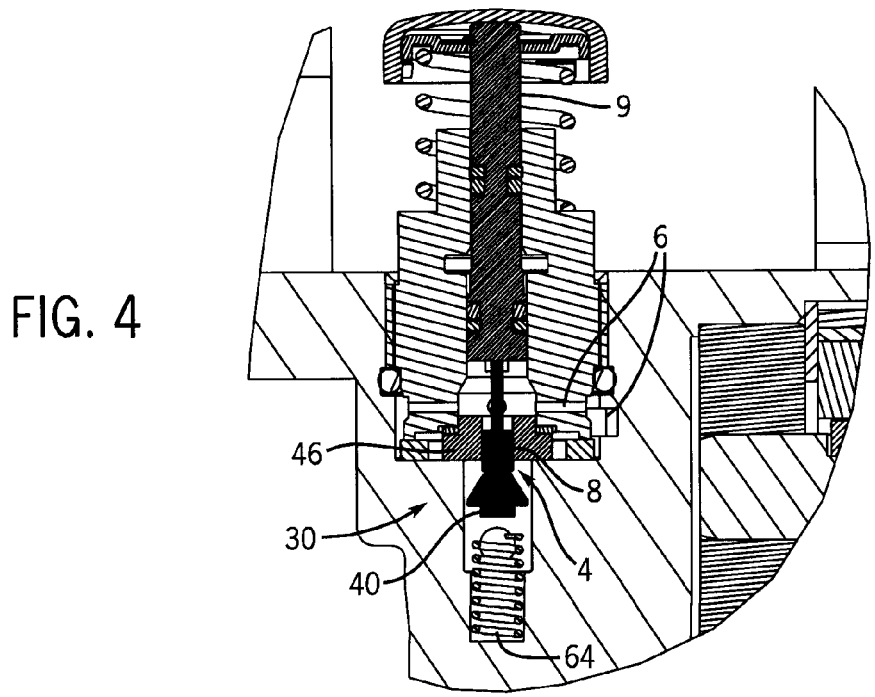
FIG. 4 is a fragmentary cross-sectional view from the plane of the line 4-4 of FIG. 2.

FIGS. 1 and 2 illustrate a valve 30 of the invention having a housing 32 and an actuator 34 which has a stem 9 (FIGS. 3-5). Stem 9 is slideable axially in valve body 36 and is biased upwardly into a closed position of the actuator by a spring 38. Stem 9 is sealed to the bore of valve body 36 in which it slides by suitable upper 35 and lower 37 sliding seals that define a pressure balance passageway 15 between them.

Figure 9:
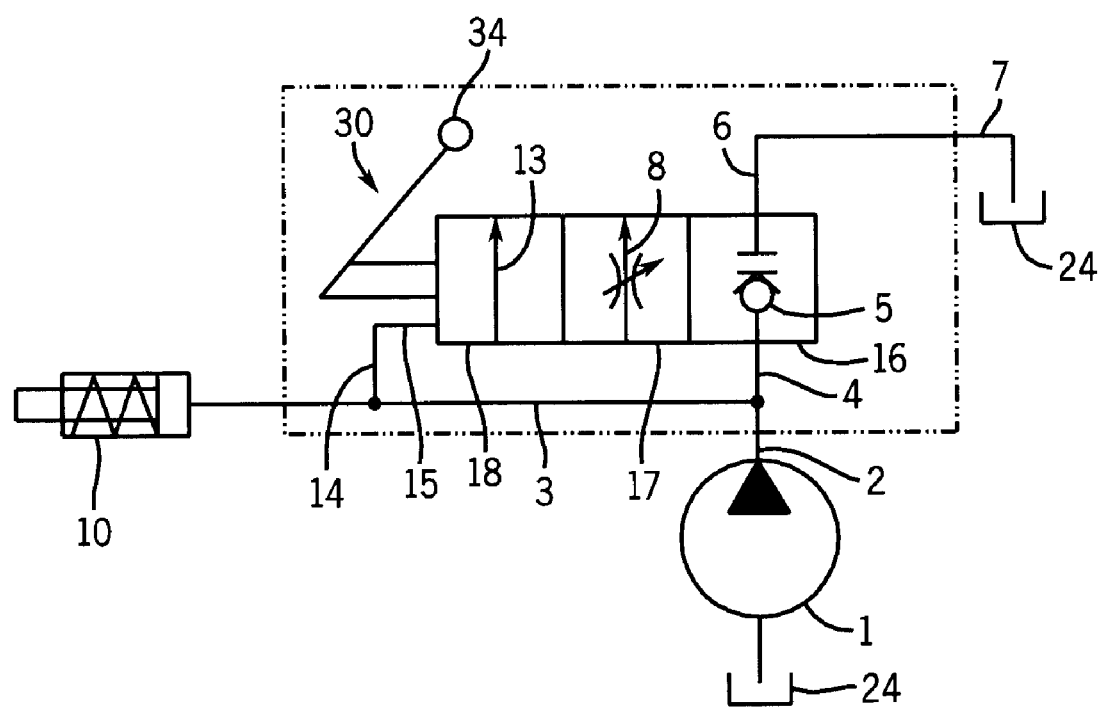
FIG. 9 is a schematic representation of the valve in a hydraulic system in which it can be incorporated.

Referring to FIG. 9, a hydraulic system in which a valve 30 of the invention can be incorporated has a pump 1 or other source of hydraulic fluid under pressure that supplies pressure through passageways 2 and 3 to a spring-return, single-acting cylinder 10 or other load hydraulic device. The pump output line 2 is also connected by passageway 4 to the inlet of the valve 30. Valve 30 has three positions, a zero-leak closed position 16, a metering position 17, and a fully open position 18. A valve element 40 has a closing portion 5, a metering portion 8 and an opening portion 13 which determines the function of the valve. Flow from the valve passes through passageway 6 to passageway 7 which is in communication with tank or reservoir 24. In the closed position of the valve 30 illustrated in FIG. 9, no flow from the pump 1 is permitted to tank 24, and full pressure is provided to the load 10 and is held by the valve 30. If the valve 30 is shifted rightwardly as viewed in FIG. 9 to the (middle) metering position 17, a metered amount of fluid is permitted to pass through the valve 30 from the load 10 (and from the pump 1 if it is on) to the tank 24, so that the load 10 can be retracted either more slowly or quicker, depending upon how much flow is permitted to pass by the valve 30 by operating the actuator 34. In other words, pressing harder and positioning the actuator 34 further vertically downward results in a greater flow rate than positioning it at a relatively more upward, yet still open, position. Where applicable, reference numbers used in FIG. 9 correspond to reference numbers used to identify physical elements in the other figures.

If the valve 30 is shifted all the way to the right to the full open position, i.e., actuator 34 pushed all of the way down, full open flow is permitted through the valve 30 so that the cylinder 10 may retract at the maximum rate by fluid flowing from the cylinder 10 to the tank 24 through the valve 30.

Also illustrated in FIG. 9 are lines 14 and 15 that are pressure balance passageways, shown in FIG. 3. The pressure balance passageways 14 and 15 connect source pressure, or load pressure, to an upper portion of the bore of body 36 in which stem 9 is reciprocable between the seals on the stem 9. The area at the base of the stem 9 around which the lower seal 37 extends is greater than the area at the top of the stem 9 around which the upper seal 35 extends and so therefore the pressure exerted in the passageway 15 produces a net force downward on the stem 9, tending to open the valve. This force is overcome by the hydraulic pressure acting on the bottom of valve element 40 so that on net the pressure acts to close valve element 40, but the pressure in passageway 15 reduces the amount of force required to open valve element 40. The amount of force exerted by the pressure in passageway 15 is determined by appropriately sizing the lower portion of stem 9 relative to the upper portion of stem 9.

Figure 7:
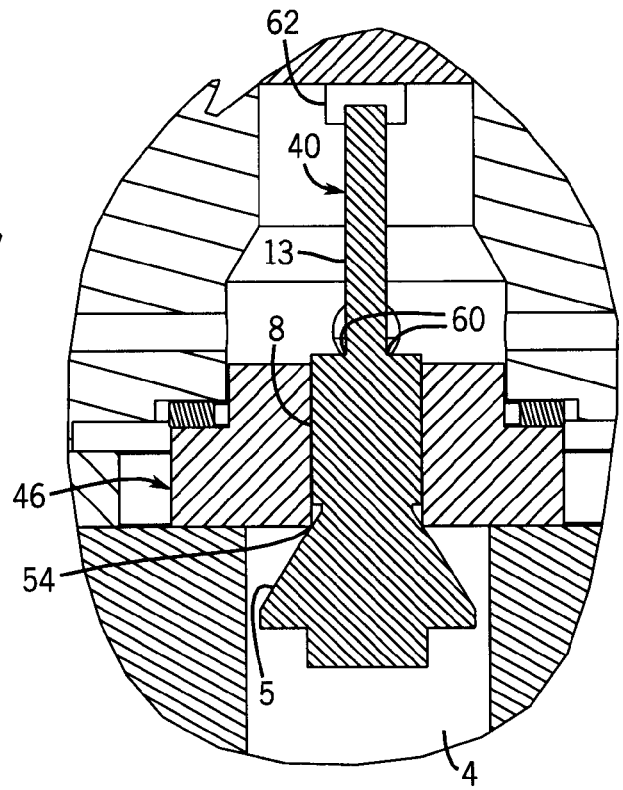
FIG. 7 is a detail view like FIG. 6, but showing the valve in a closed position.
Figure 8:
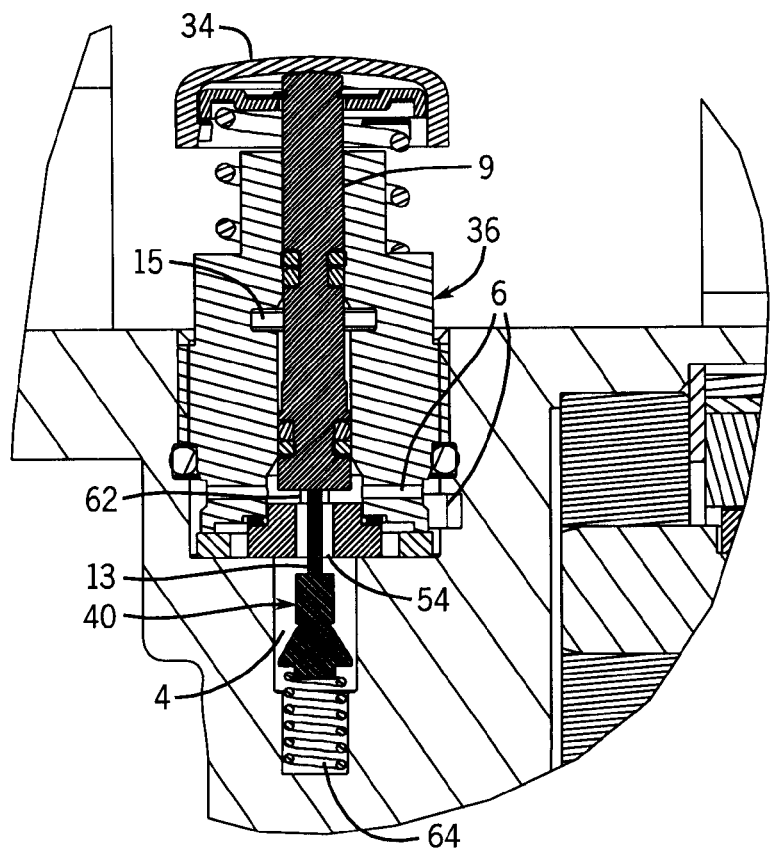
FIG. 8 is a fragmentary cross-sectional view like FIG. 4, but showing the valve in a full open position.

FIG. 7 illustrates the closed position 16 of the valve 30, FIG. 6 illustrates a metering position 17 of the valve 30, and FIG. 8 illustrates the full open position 18. The valve 30 has a valve block 46 positioned within the housing 32 and sealed between high pressure passageway 4 and low pressure passageway 6. The valve block 46 has a valve bore 48 through it defining a valve bore axis along which the valve element 40 is reciprocable. The metering portion 8 of the valve element 40 has a close sliding fit with the bore 48 that permits fluid to escape through the clearance between the portion 8 and the valve bore 48, the flow rate of which is variable depending upon the overlapping length 50 between the portion 8 and the bore 48. For longer overlapping lengths, the flow rate is less, and for shorter overlapping lengths, the flow rate is greater.

At the end of valve bore 48 adjacent to closing portion 5, specifically at the junction of valve bore 48 with axial face 52, a circular seat 54 is defined at the corner between the bore and the face. As shown in FIG. 7, seat 54 seats against closing portion 5, which is frusto-conical in shape, to create a seal that completely closes off high pressure chamber 4 from low pressure passageway 6. Any enlarged shape (enlarged relative to the bore 48 and metering portion 8) that presents a circular cross-section in the plane of the seat 54 to conform to the seat 54 would be appropriate, for example a partial spherical or frusto-spherical shape would also work, to create a shear seal with the seat 54. Seat 54 interfacing with closing portion 5 shuts off all flow into bore 48 from chamber 4.

Opening portion 13, like metering portion 8, may also be round and of the same diameter as metering portion 8, except that opening portion 13 is flattened on opposite sides, as shown in FIG. 7 and FIG. 8, so as to provide reliefs 60. This provides flow paths between opening portion 13 and the bore 48 once the reliefs 60 are moved past the seat 54. This initiates the full open position, when the reliefs 60 are moved sufficiently past the seat 54.

Stops 62 formed on the bottom end of the stem 9 stop against the valve block 46 when the actuator 34 is pushed all of the way down to provide sufficient clearance between the end of the stem 9 and the bore 48 for fluid to escape from the bore 48. Spring 64 below valve element 40, opposite from stem 9, urges element 40 upwardly to a position where metering portion 8 is adjacent to or entering bore 48 so as to create a pressure differential that will urge element 40 upwardly and back into the fully closed position shown in FIG. 7, when stem 9 is returned to an upward position.

Thus, in the neutral position illustrated in FIGS. 7 and 9, fluid flow from pump 1 through passageways 2 and 3 is directed to the work or load, in this case a single acting cylinder 10. Flow through passageways 2, 3 and 4 is prevented from returning to tank 24 by positive sealing between closing portion 5 and seat 54. This is the zero leak blocked flow position 16 shown in FIG. 7 and FIG. 9.

In the metering return flow position 17 of FIG. 9, the operator depresses actuator 34 to move closing portion 5 off of seat 54 and by positioning element 40 in the bore 48 controls the flow rate from the load 10 back to the reservoir 24. In the metered return flow position, the pump is typically turned off and no flow is allowed through the pump due to outlet check valves i.e., one way valves, in the pump. Return flow will be from the load or cylinder 10, through passageways 3 and 4. As the closing portion 5 is moved away from the seat 54 by depressing stem 9, a controlled clearance passageway is created between metering portion 8 and bore 48 which creates a restriction to flow by means of the controlled clearance between portion 8 and bore 48 and the overlapping distance 50 which is determined by how far the stem 9 is depressed. This is the metered flow position of FIG. 6 and position 17 in FIG. 9. As the stem 9 is further depressed, the rate of return flow to tank is increased due to the reduction of the distance 50 that the fluid must travel between portion 8 and bore 48. The force to depress the stem 9 against the hydraulic pressure acting at the bottom of element 40 is counterbalanced by passageways 14 and 15 acting on the counterbalance area on the stem 9, which preferably reduces the force required to operate stem 9 by 85 percent. This reduces the effort required by the user to operate actuator 34. This is especially useful when the valve is being used to control pressures in the 5-10,000 psi range or higher.

In the full flow position of FIG. 8 and position 18, undercuts 60 are moved past the seat 54 preferably until stops 62 contact the top of valve block 46. In this position there is little or no restriction to flow from chamber 4 to passageway 6, and far less than the restriction when the metering portion 8 is received in the bore 48. This return flow results in a fast retract speed of the single acting cylinder 10.

A preferred embodiment of the invention has been described in considerable detail. Many modifications and variations to the preferred embodiment described will be apparent to a person of ordinary skill in the art. Therefore, the invention should not be limited to the embodiment described, but should be defined by the claims which follow.

I claim:

1. A zero leak metering valve, comprising
a valve housing having a valve bore defining a valve bore axis, the valve bore having a certain length between opposing end faces, with one of the end faces defining a valve seat at a juncture between the one of the end faces and the valve bore;
a valve element moveable along the valve bore axis within the valve bore, the valve element having a cylindrical variable flow portion between a closing portion and a full open portion, the variable flow portion fitting in the bore with a certain clearance between the variable flow portion and the bore and moveable relative to the bore so that the length of the variable flow portion that overlaps the bore varies as the element is moved from a closed position to a full open position, the closing portion seating against the valve seat in the closed position and the open portion permitting the variable flow portion to be moved out of the valve bore to permit flow for the length of the valve bore between the valve bore and the full open portion in the open position; and a valve stem separate from the valve element that is operable by a user to displace the valve element out of the closed position; wherein
the overlap between the bore and the variable flow portion meters flow through the clearance between a minimum flow rate at maximum overlap and a maximum flow rate at minimum overlap; and
wherein the valve element is biased into the closed position by fluid pressure and moved into the open position against the bias of the fluid pressure.

2. A zero leak metering valve as claimed in claim 1, wherein the valve bore is cylindrical.

3. A zero leak metering valve as claimed in claim 1, wherein the closing portion is enlarged relative to the variable flow portion to present a shape in the plane of the seat that conforms to the seat to establish a shear seal with the seat.

4. A zero leak metering valve as claimed in claim 1, wherein the three portions are integral with one another.

5. A zero leak metering valve as claimed in claim 1, wherein the valve is manually operated.

6. A zero leak metering valve as claimed in claim 1, wherein an actuator of the valve is spring biased to the closed position.

7. A zero leak metering valve as claimed in claim 1, wherein the valve is pressure counterbalanced to reduce the force to open the valve.

8. A zero leak metering valve, comprising
a valve housing having a valve bore defining a valve bore axis, the valve bore having a certain length between opposing end faces, with one of the end faces defining a valve seat at a juncture between the one of the end faces and the valve bore;
a valve element moveable along the valve bore axis within the valve bore, the valve element having a variable flow portion between a closing portion and a full open portion, the variable flow portion fitting in the bore with a certain constant clearance between the variable flow portion and the bore and moveable relative to the bore so that the length of the variable flow portion that overlaps the bore varies as the element is moved from a closed position to a full open position, the closing portion seating against the valve seat in the closed position and the open portion permitting the variable flow portion to be moved out of the valve bore to permit flow for the length of the valve bore between the valve bore and the full open portion in the open position; and
a valve stem separate from the valve element that is operable by a user to displace the valve element out of the closed position;
wherein the overlap between the bore and the variable flow portion meters flow through the clearance between a minimum flow rate at maximum overlap and a maximum flow rate at minimum overlap; and
wherein the valve element is biased into the closed position by fluid pressure and moved into the open position against the bias of the fluid pressure.

9. A zero leak metering valve as claimed in claim 8, wherein the valve bore is cylindrical.

10. A zero leak metering valve as claimed in claim 8, wherein the closing portion is enlarged relative to the variable flow portion to present a shape in the plane of the seat that conforms to the seat to establish a shear seal with the seat.

11. A zero leak metering valve as claimed in claim 8, wherein the three portions are integral with one another.

12. A zero leak metering valve as claimed in claim 8, wherein the valve is manually operated.

13. A zero leak metering valve as claimed in claim 8, wherein an actuator of the valve is spring biased to the closed position.

14. A zero leak metering valve as claimed in claim 8, wherein the valve is pressure counterbalanced to reduce the force to open the valve.

* * * * *